July 16, 1968

L. E. TUCKER 3,393,291

PLASTIC FILM TRIM SEALER

Filed Dec. 23, 1965

LEONARD E. TUCKER
*INVENTOR.*

BY *Roy V. Smith, Jr.*
ATTORNEY

July 16, 1968

L. E. TUCKER 3,393,291

PLASTIC FILM TRIM SEALER

Filed Dec. 23, 1965

LEONARD E. TUCKER
INVENTOR.

BY Roy H. Smith, Jr.
ATTORNEY

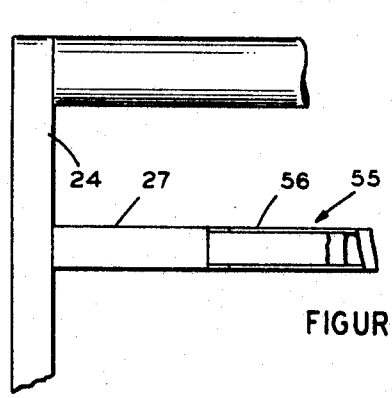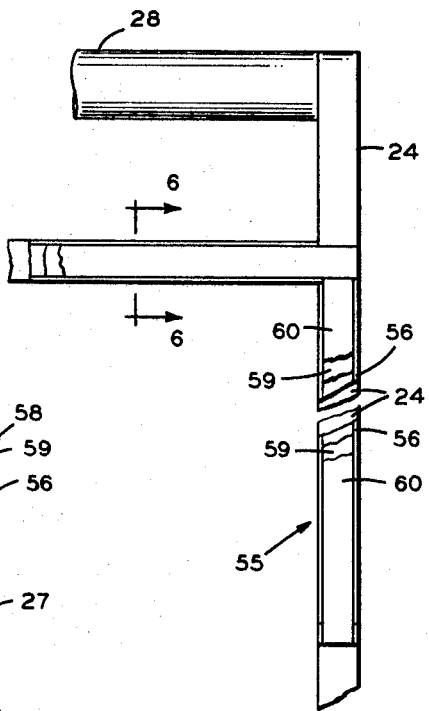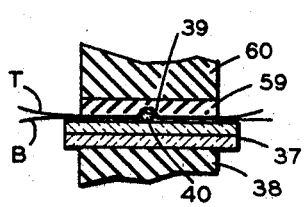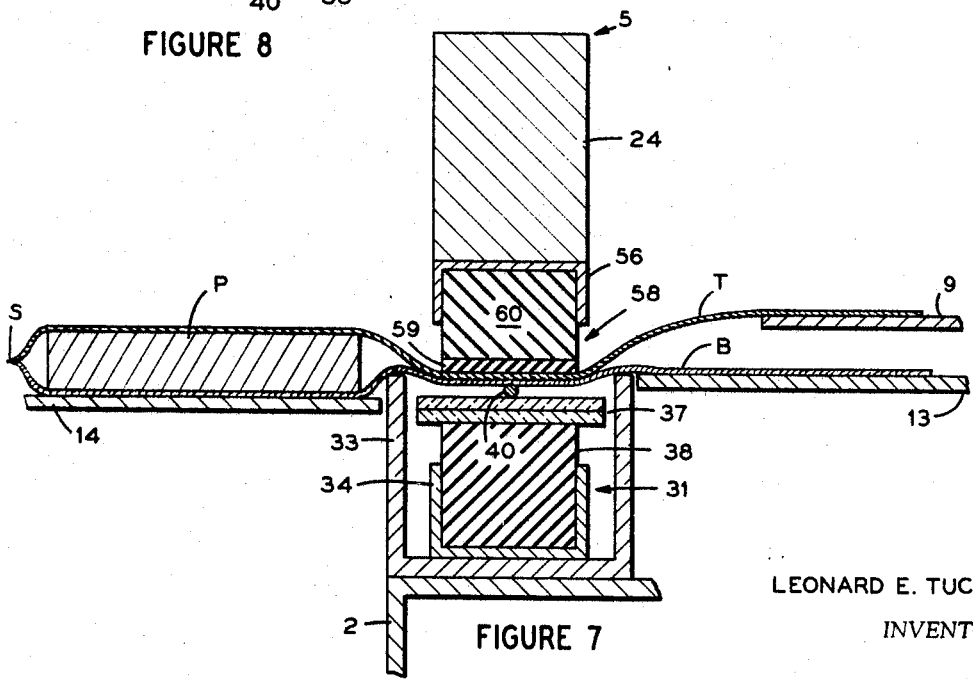

United States Patent Office 3,393,291
Patented July 16, 1968

3,393,291
PLASTIC FILM TRIM SEALER
Leonard E. Tucker, Houston, Tex., assignor to Trim Seal Inc., Houston, Tex., a corporation of Texas
Filed Dec. 23, 1965, Ser. No. 516,041
12 Claims. (Cl. 219—243)

ABSTRACT OF THE DISCLOSURE

A sealing device having an upper and a lower assembly and a hot wire element for cutting and bonding plastic film. The resistance element comprises a single hot wire, bent in a loop to form two sides intersecting in an L-pattern, contiguously mounted in tension on the lower assembly which includes a glass backing strip mounted on a rubber backing member. The upper assembly comprises a Teflon strip mounted on a rubber backing member, said upper assembly being movably mounted whereby plastic film pulled between the upper and lower assembly members is simultaneously cut and bonded by the hot wire member.

---

The present invention lies in the field of devices for trimming or cutting plastic films and leaving beside the cut a sealed bead which may be utilized as an edge of a package or envelope for an article of merchandise. In greater particular, the invention utilizes one or more hot wires to cut and seal plastic films f various compositions, e.g., polyolefins, polyethylenes, etc.

The use of plastic film as an envelope around various articles has many advantages, including keeping dirt out, discouraging theft or tampering with the article, and preventing the separation and loss of component parts of an article made in pieces or furnished with such mounting items as screws and nuts. When the film is transparent, as is most commonly the case, the plastic envelope also serves as a convenient means of displaying the encapsulated article to potential customers and permits a quick inspection of the article to determine what sort of condition it may be in. Papers and tags describing the article and instructing the purchaser in its use may be packaged with it and are also readily observable through a clear film.

Heretofore such plastic envelopes have frequently been formed around various articles by wrapping the articles more or less in the same manner as they would be wrapped in ordinary paper, gathering and folding the overlapping ends together and securing them with a hot platen sealing device. This type of wrapping is undesirable because the folded ends as thus secured together are a bulky, unsightly wad. Moreover, it is not always possible to form such a wad so that the envelope is fully sealed. A much superior envelope is provided by placing the article on one thickness of plastic film, covering it with a second thickness, bringing the four edges of the top and bottom panels together and cutting them with a hot wire which also leaves a seal. There is no excess material to mar the appearance of the encapsulated article and interfere with its subsequent handling, and the plastic cover, if made of a heat shrinkable material, may be further improved in appearance by running it through a heat tunnel which shrinks and stretches the plastic to eliminate all small wrinkles and gathers. Most articles can thus be encapsulated in a rectangular film package, and one of the four edges can be preformed by a fold in the plastic film. In repetitive packaging of identical articles, a second cut may be eliminated by utilizing a seal left behind when the previous article was sealed, leaving only two edges to be trimmed and sealed. These edges will intersect at a corner, and a trim sealer device like that of the present invention may trim and seal these remaining edges simultaneously, only one pass through the device being required for complete packaging.

It is known that devices somewhat similar to that of the present invention have been used, such prior art devices utilizing as the cutting element a thin strip of high resistance metal alloy material disposed transversely to the plastic film so that only the edge of the strip contacts the film. The film is pressed against the metal strip by a resilient member formed by securing to a foam rubber base a thin film of plastic material selected primarily for its high heat resistance.

Such devices have several disadvantages. The cutting member is difficult to stand on edge, and most of the heat in it is wasted because only one edge is utilized. The resilient pressing member has a short life and requires frequent repair or replacement because the outer layer of film becomes charred through quite quickly. This member must also be secured so that it cannot be replaced readily, the result being down time for the machine during repair or replacement.

The principal object of the present invention is to provide a plastic film trim sealer which avoids the disadvantages of prior art devices. Another object is to provide such a trim sealer having a long life before any component wears out and requires replacement. Another object is such a trim sealer wherein the components most likely to require replacement are so mounted that replacement can be made very quickly.

Another object is to provide a plastic film trim sealer in which the cutting and sealing member is a hot wire heating element disposed in backing relationship with an incombustible, resilient backing member and in which the plastic film is brought into forcible contact with the hot wire by an incombustible, resilient pressing member.

In general, the objects of the present invention are accomplished by utilizing as the cutting element a high resistance heating wire and disposing such wire in a horizontal plane slightly below a horizontal work table on which the plastic film to be cut is laid. The cutting wire is held in tension by appropriate springs over the flat outer surface of a strong, incombustible material such as glass, the glass preferably being bonded to a resilient backing material such as foam rubber. The pressing member which forces the film to be cut against the wire is a relatively thick strip of strong, incombustible or heat resistant material, preferably a relatively resilient plastic such as polytetrafluoroethylene bonded to a backing of a more resilient material such as foam rubber. Both the glass strip and the plastic strip present horizontal surfaces parallel to the film, and both are disposed so that they may easily be replaced. In practice, it has been found that the relatively thick plastic member has little tendency to char except to form a groove for the wire, and hence replacement does not become a problem.

The present invention and the manner of effecting the above recited advantages may be more readily understood by reference to the accompanying drawing, in which:

FIGURE 1 is an overall exterior perspective view of one preferred embodiment of the invention as it would appear to an operator employed to use it in packaging various articles, FIGURE 2 is a fragmentary plan view of the apparatus of FIGURE 1 showing the L-shaped hot wire element which does the cutting and trimming, FIGURE 3 is a transverse cross-section of the hot wire element and the lower backing member, as indicated by the cutting plane and arrows 3—3 of FIGURE 2, FIGURE 4 is a longitudinal cross-section of the hot wire element and the lower backing member showing the mounting of the wire, as indicated by the cutting plane and arrows 4—4 of FIGURE 2, FIGURE 5 is a fragmentary plan view of the upper backing member and the swingable arm in which it is supported, such structure also being part of the FIGURE 1 embodiment.

FIGURE 6 is a transverse cross section of the upper backing member of FIGURE 5, as indicated by the cutting plane and arrows marked "6—6,"

FIGURE 7 is a composite longitudinal cross section of the same apparatus showing the operational position of all parts at the beginning of a cutting and sealing operation, the thickness of the plastic film being exaggerated to make the separate layers visible, and FIGURE 8 is a partial cross section like that of FIGURE 7 showing the principal parts after a certain amount of use.

Figure 1:
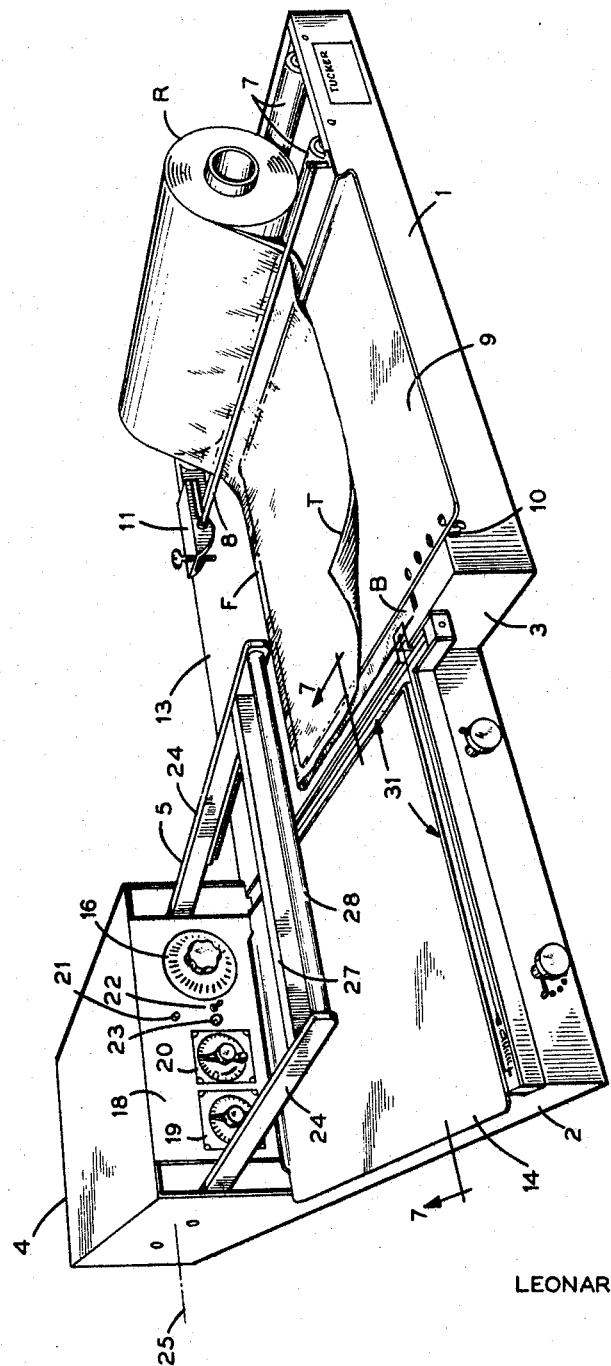

As shown in the preferred embodiment of FIGURE 1, the overall equipment of the trim sealer of the invention includes a right hand base member 1 integrally secured to a left hand base member 2 so that the right hand base has an offset portion 3 projecting slightly forwardly from the left hand base, the left base including an equipment box 4 to which the moving arm 5 is pivotally secured. At the right side of right hand base 1 are a pair of idler rollers 7 adapted to support a roll of folded plastic film R with its axis parallel to the edges of the base which extend perpendicular to the right-to-left direction in which the film will be moved through the device. Also included with the right hand base member 1 is a guide rod 8 under which the film moves as it is pulled from roll R, a load table 9 supported from the front edge of the base by brackets 10 and serving to separate the two thicknesses of the folded plastic film, and adjustable brake 11 used to prevent the film from spinning too rapidly from roll R. The top panel 13 of base member 1 presents a flat metallic work surface, and the load table 9 is spaced about 3/16" above the work surface so that the bottom panel B of the folded plastic passes between members 9 and 13 while the top panel T passes over load table 9, the fold F of the film passing along the rear edge of load table 9.

The left hand base member 2 supports at its right edge a transverse trim seal element assembly 31 and at its forward edge a longitudinal trim seal element assembly 32. The balance of the base member 2 forwardly of equipment box 4 supports an upper panel 14 which is adjustable in height relative to top panel 13 of the right hand base by adjustment means 15. This panel 14 serves as the working surface on which the operator places an item to be packaged between the bottom panel B and the top panel T of the folded plastic film.

Equipment box 4 contains a variable transformer whose output is adjusted by the dial 16 mounted on the vertical front panel 18, which also serves as a control panel, timers also mounted on panel 18 and controlled by dials 19 and 20, and the other electrical equipment and wiring for the device. Also mounted on control panel 18 are an on-off switch 22 for controlling power input to the device, a power-on lamp 23 to indicate the condition of switch 22, and a readily replaceable fuse 21. The side panels of box 4 serve as supports for the moving arm 5, each panel mounting one of the side arms 24 with a facer plate bearing so that the arms rotate together about a common horizontal axis 25. These side arms 24 are secured together by cross arm 27 and handle 28 so that all parts of moving arm member 5 rotate as an integrated unit.

Figure 2:
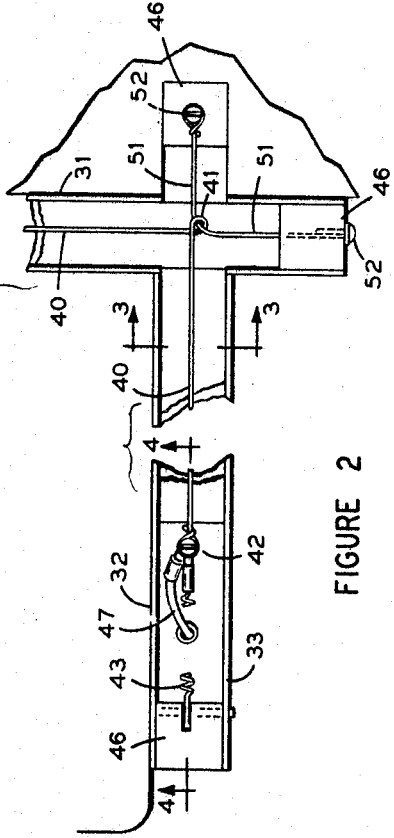
Figure 3:
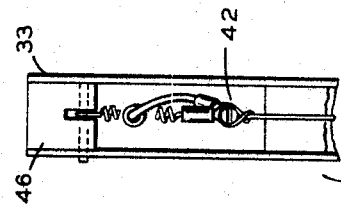
Figure 4:
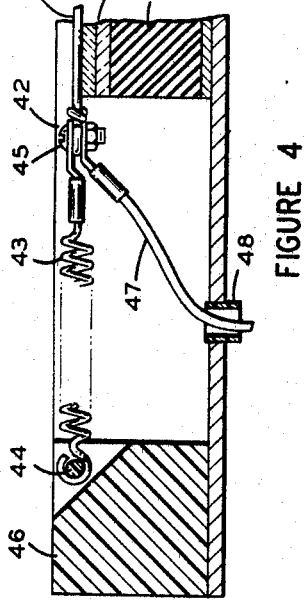

Turning to FIGURES 2-4, the trim seal elements 31 and 32 disposed respectively at the right hand and forward edges of working panel 14 are identical and only one need be described. Each includes an outer channel member 33 secured to base 2 and an inner channel member 34 secured to channel 33 at its base, both members being disposed with their open tops disposed upwardly and the inner chanel member 34 serving as a pocket to receive backing member assembly 36. The backing member assembly 36 is used to back wire 40, and includes the interbonded glass strip 37, here a double thickness of automobile safety glass, and foamed rubber member 38, the wire 40 being mounted so that it lays on the surface of glass strip 37. Only one length of wire 40 is used for both assemblies 31 and 32, the wire being bent at corner 41 and the free ends being secured in terminals 42 secured to springs 43 fixed to a block of insulating material 46 by pins 44 of the same material. The material employed was Bakelite, and block 46 was firmly secured to channel 33. The same screw 45 used to secure the wire to the spring also serves to secure the wire to connection lead 47 which passes through an insulating sleeve 48 in channel 33 and under panel 14 to the power supply equipment in box 4. At the corner 41 of the wire, a short length of wire 51 is bent into an L and each arm 51 of the L is aligned with a section of wire 40 and mounted by a screw 52 secured to another fixed block of Bakelite 46 so as to constitute a projection of such section of wire 40. It is important that the corner be made up as shown, no piece of cold wire passing over a hot wire, for if this were allowed there would be a blind spot in the cut made by the hot wire. No current, of course, passes through any part of the supporting wire 51.

Turning to the fragmentary view of the movable pressing arm 5 presented in FIGURE 5, a view looking at the lower faces of side arms 24 and cross arm 27 as they appear in FIGURE 1, it will be observed that cross arm 27 and the right hand side arm 24 each contain an identical backing member assembly 55. Since the cross section of one assembly would appear just like the other, only one is illustrated in FIGURE 6. The assembly includes a downwardly opening channel member 56 secured to one of the arms 24 or 27 and a backing member assembly 58 consisting of an outer strip 59 of fairly firm but resilient, heat resistant plastic such as polytetrafluoroethylene and a more resilient inner member 60 of foam rubber or the like. In successfully operated embodiments of the invention member 59, which contacts the plastic film to be cut and holds it in contact with the hot wire 40, has been made of Teflon filled to the extent of 35% of its weight with glass fibers, the strip being ½ inch wide and 1/16 inch in thickness. Backing member 60 (and likewise backing member 38 of the lower backing assembly 36) was approximately square in cross section, being 7/16 inch wide by ½ inch thick and secured to strip 59 by a suitable adhesive. Backing member 60 is sufficiently resilient so that the assembly 58 may be mounted in channel 56 simply by forcing it in by squeezing on rubber block 60 and without any other means of holding it in place, and the assembly 58 is easily removed in the same manner. Lower backing member assembly 36 is similarly easily installed and removed from channels 33 and 34. It should be noted that the assemblies 58 and 36 extend beyond their channels 56 and 33, and that none of the latter come into contact with the plasic film, whereas the top surface of lower assembly 36 lies below the edges of outer channel 33 and similarly wire 40 lies below the edges of channel 33. This arrangement insures that the film to be cut will not contact wire 40 in a heated condition until the film is pushed down against the wire by assembly 58.

FIG. 7 illustrates in section an article P being packaged by the embodiment of FIGURE 1, the view being taken by a sectioning plane passing through the lower transverse trim seal element assembly 31 and the corresponding upper backing assembly 58 disposed at right angles to the direction of movement of the film through the device. The view is taken at the instant that movable pressing arm 5 is rotated to contact the plastic film and force it against wire 40, at which time one of the assemblies 58 register with and lies parallel to and just above transverse assembly 31 while the other lies parallel to and just above longitudinal assembly 32. No current has passed through wire 40 as yet, but the previous movement of arm 5 has closed a switch and in the next fraction of a second an impulse of electrical energy will flow through wire 40 and heat it to a red heat, causing it to burn through both the bottom panel B and the top panel T of plastic and joining them by a bead S on each side of the wire. Prior to lowering arm 5 the operator has inserted a package P between the top and bottom panels so that the rear face of the package lies against the fold F joining the two panels (not visible in FIGURE 7) and with the left side of the package P pushed up against the seal S joining the two panels, this seal S being left from the last cycle of packaging on the preceding article.

FIGURE 8 shows the same parts after they have had some initial use in cutting and sealing, the thickness of the plastic films T and B here being shown more accurately with respect to the dimensions of the structure. It will be noted that a slight groove 39 has been formed in the Teflon strip 59 as the result of gradual charring by hot wire 40. This groove appears to increase the effectiveness of the invention, as the groove receives the wire and wraps the film around a larger part of the wire, and it also makes for a firmer pressing of the film by the portions of the Teflon on each side of the groove.

The operator will hold movable arm 5 in the depressed position shown in FIGURE 7 for only a fraction of a second, as the time during which current is passed through wire 40 has been previously set and the circuit will automatically be opened after, e.g., about ¼ second of heating. The operator holds arm 5 down thereafter for only a fraction of a second of dwell time, during which time no current passes through wire 40, and then raises the arm out of his way, removes the packaged article, and pulls the film R so that it occupies the position shown in FIGURE 7 and starts another cycle by inserting a new article P and again depressing arm 5.

No circuitry has been shown because it is conventional and straightforward, utilizing only well known elements familiar to the prior art. The source of power for the device is the ordinary 110-volt, 60 cycle alternating current, but it may also be readily adapted to any other voltage or frequency. Note may be made that the switches used to close the power circuit (not shown) are mounted on the side arms 24 of movable assembly 5, such switches preferably being of the mercury type to avoid pitting and replacement. These switches are only closed at the instant that assembly 5 reaches the horizontal position shown in FIGURE 7, and they include in their circuit a timer set for a fraction of a second. At the end of this timed interval the voltage applied to the two ends of wire 40 is instantly reduced to zero and a second timer in a separate circuit is activated, this second timer being connected in series with a buzzer operable for another fraction of a second during which the operator holds arm 5 depressed for the abovementioned "dwell time" to insure even dissipation of heat through out the plastic film and resulting in superior seals on the sides of the cut. Note may also be made that power is connected to the hot wire 40 through a variable transformer which may be adjusted to provide a wide range of voltages to the wire, more or less voltage being applied for different thicknesses and compositions of plastic films.

As an example of a typical embodiment, both arms of hot wire 40 in assemblies 31 and 32 were 15 inches, the total length of wire thus being 30 inches. The wire was 18 gauge, or 0.040 inch in diameter, and was made of 80% nickel, 20% chromium (both by weight), this alloy being commercially available under the trademark "Chromel A." The film being used as the packaging material was 1 mil in thickness, and in composition was a crosslinked polyolefin commercially available under the trademark "Cryovac D-925." This material was satisfactorily trimmed and sealed by applying 50 volts to it (for a current flow through wire 40 of 50 amperes) for ¼ of a second.

The above paragraphs constitute a complete description of one preferred embodiment of the present invention, but do not constitute a disclosure of its full scope. What is believed to be new and unobvious is the combination of the hot wire and the backing members above and below it, in particular the nature and disposition of such members relative to the wire. The wire is shown as fixed to the base as a matter of choice, but it can with equal facility be mounted on the movable pressing member, if desired.

It is necessary that the hot wire and the plastic film be temporarily clamped or gripped firmly between a pair of backing members, but the materials selected for such members may vary widely in nature and composition. Both must be incombustible or highly heat-resistant, a characteristic of both the glass and the Teflon used in the described embodiment. Thus both upper and lower members of glass have been used successfully in an operating trim sealer, and similarly both backing members have been made of Teflon. There are, of course, many other materials which are incombustible and possess the necessary rigidity or semi-rigidity and could be used as substitutes for one or both of the backing members which contact the plastic film.

With respect to the supporting material for the backing members (which might be called backing for the backing), it is believed to be essential that one of the backing members that contact the film be supported on a resilient support or backing to insure an even distribution of pressure on the plastic film over the whole length of the wire. The other backing member may be more rigidly mounted, although a resilient backing for it is preferred, in addition. Such resilient support may take a wide variety of forms, even including spring mounts. The foam rubber used in the embodiment described has a number of advantages, including a low cost, light weight and ease of compression. As mentioned above, it may be easily inserted and pulled from its metal supporting channel, and it stays in place in such channels without the use of additional securing elements. In addition, it is easily bonded to all other materials used in the present invention, and thus assists in securing the backing members in their appointed locations. It may here be noted that the Teflon backing member used in the described embodiment, becoming somewhat resilient in itself, could have been used without a resilient support, but use of the resilient rubber support reduced the cost of the assembly and made it more easily replaceable.

What is claimed is:

1. A hot wire trim sealer for cutting and sealing multiple layers of plastic film along two lines intersecting at a corner, comprising a pair of intersecting straight line sections of heating wire each supported in tension in a common plane and a pair of incombustible backing members disposed in face to face relationship on opposite sides of said section of wire and in contact therewith, at least one of said incombustible backing members being resiliently mounted, one of said backing members being mounted so that it may first be moved in one direction away from the wire to define a space therewith in which said multiple layers of film are introduced, and may thereafter be moved in the opposite direction to its original position to force said layers of film into contact with said wire, said wire being adapted for connection to a source of electrical energy which may thereafter be activated to heat said wire sufficiently to burn through said layers of film and form seals between layers on each side of the burn, said intersecting pair of heating wire sections being formed of a continuous length of heating wire in which the wire at the corner intersection is provided with a loop formed by initially bending the wire at the end of one section away from the desired direction of the other section and continuing to bend such wire until it crosses the first section and in the desired direction of the other section, said sections being supported and tensioned at their intersection by a cold wire member passing through said loop and extending to insulating supports spaced from the loop end of each wire section and in line therewith, whereby as current is passed through said sections of heating wire every portion of their continuous length exposed to the layers of film reaches the cutting and sealing temperature.

2. The hot wire trim sealer of claim 1 in which at least one of said backing members is made of glass.

3. The hot wire trim sealer of claim 2 in which said glass backing is resiliently supported.

4. The hot wire trim sealer of claim 1 in which one of said backing members is a strip of glass and said strip of glass is mounted on foam rubber.

5. The hot wire trim sealer of claim 4 in which the other of said backing members is made of polytetrafluoroethylene.

6. A hot wire trim sealer for cutting and sealing multiple layers of plastic film, comprising at least one straight line section of heating wire supported in tension and a pair of incombustible backing members disposed in face to face relationship on opposite sides of said section of wire and in contact therewith, one of said backing members being a glass strip and the other being a strip of polytetrafluoroethylene, said glass strip being resiliently mounted on a pad of foam rubber, one of said backing members being mounted so that it may first be moved in one direction away from the wire to define a space therewith in which said multiple layers of film are introduced, and may thereafter be moved in the opposite direction to its original position to force said layers of film into contact with said wire, said wire being adapted for connection to a source of electrical energy which may thereafter be activated to heat said wire sufficiently to burn through said layers of film and form seals between the layers on each side of the burn, said polytetrafluoroethylene backing being glass filled and both it and the glass strip being resiliently mounted.

7. The hot wire trim sealer of claim 6 in which both said glass and polytetrafluoroethylene backing members are secured to foam rubber strips by adhesives.

8. The hot wire trim sealer of claim 7 in which said backing members are mountable in metal channels solely by squeezing said foam rubber into the channels.

9. The hot wire trim sealer of claim 1 in which said two straight line sections of wire are disposed to form an L shape.

10. A plastic film trim sealer comprising a section of heating wire mounted in tension in one of a fixed base member and a movably mounted pressing arm member, a first backing assembly mounted on one said member on one side of said heating wire and presenting a first surface in approximate contact therewith, and a second backing assembly mounted on the other member on the other side of said wire, said second backing assembly presenting a second surface facing toward the first, the one of said backing assemblies mounted on the pressing arm member being adapted to be moved to an operative position in which its said surface is parallel to said surface of the other backing member assembly and forcibly contacts a number of thicknesses of plastic film and holds such film tightly against said wire and between said first and second surfaces, one said backing member surface being defined by a polytetrafluoroethylene strip while the other said surface is defined by a glass strip, each of said strips being secured to a resilient rubber mounting.

11. A plastic film trim sealer comprising a section of heating wire mounted in tension and adapted for connection to a source of electrical power, a lower backing assembly disposed below said wire and presenting an upper surface contacting the wire, an upper backing assembly having a lower surface, said upper assembly being pivotally mounted above said wire and adapted to be rotated to an operative position in which its lower surface is parallel to said upper surface of the lower backing assembly and in which such lower surface forcibly contacts a number of thicknesses of plastic film and holds such film tightly against said wire, said lower backing assembly comprising an outer member in the form of a glass strip, said upper backing assembly comprising an outer member of incombustible, semi-resilient plastic material and an inner member of resilient rubber.

12. The plastic film trim sealer of claim 11 in which said outer member of the upper backing assembly is a strip of polytetrafluoroethylene.

References Cited

UNITED STATES PATENTS

| | | | |
|---|---|---|---|
| 2,796,913 | 6/1957 | Fener et al. | 156—251 |
| 2,961,031 | 11/1960 | Fener | 156—380 |
| 3,006,122 | 10/1961 | Weishaus | 53—182 |
| 3,047,991 | 8/1962 | Siegel et al. | 156—515 X |
| 3,054,441 | 9/1962 | Gex et al. | 156—515 |
| 3,106,630 | 10/1963 | Klamp | 219—243 X |

RICHARD M. WOOD, *Primary Examiner.*

C. L. ALBRITTON, *Assistant Examiner.*